US012626016B1

(12) United States Patent
Donatelli

(10) Patent No.: US 12,626,016 B1
(45) Date of Patent: *May 12, 2026

(54) REAL TIME TRANSLATION SYSTEM AND METHOD INVOLVING BURDENED AND UNBURDENED CONTENT

(71) Applicant: The Language Group, LLC, Virginia Beach, VA (US)

(72) Inventor: Giovanni Donatelli, Virginia Beach, VA (US)

(73) Assignee: The Language Group, LLC, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/391,587

(22) Filed: Nov. 17, 2025

Related U.S. Application Data

(63) Continuation of application No. 19/286,965, filed on Jul. 31, 2025, now Pat. No. 12,499,272, which is a continuation-in-part of application No. 19/068,128, filed on Mar. 3, 2025, now abandoned.

(51) Int. Cl.
| | |
|---|---|
| *G06F 21/62* | (2013.01) |
| *G06F 40/205* | (2020.01) |
| *G06F 40/58* | (2020.01) |

(52) U.S. Cl.
CPC ........ *G06F 21/6245* (2013.01); *G06F 40/205* (2020.01); *G06F 40/58* (2020.01)

(58) Field of Classification Search
CPC .... G06F 40/58; G06F 40/205; G06F 21/6245; G16H 10/60
USPC ................................................ 726/27; 704/2
See application file for complete search history.

(56) References Cited

U.S. PATENT DOCUMENTS

| | | | | |
|---|---|---|---|---|
| 7,657,521 B2 * | 2/2010 | Masarie | ................. | G16H 15/00 |
| | | | | 704/10 |
| 7,689,245 B2 * | 3/2010 | Cox | ......................... | H04W 4/02 |
| | | | | 455/566 |
| 8,831,677 B2 * | 9/2014 | Villa-Real | ............... | H04M 1/66 |
| | | | | 455/552.1 |
| 2003/0065504 A1 * | 4/2003 | Kraemer | ................. | G06F 40/58 |
| | | | | 704/8 |

(Continued)

OTHER PUBLICATIONS

NPL Search Terms (Year: 2026).*

*Primary Examiner* — Syed A Zaidi
(74) *Attorney, Agent, or Firm* — Williams Mullen; Thomas F. Bergert

(57) ABSTRACT

Embodiments of a system and method as disclosed herein translate content such as discharge instructions received in English, scan, parse, remove and store burdened content such as protected health information (PHI) from the discharge instructions, apply a translation memory to the unburdened content, optionally employ artificial intelligence (AI) translation of text not addressed by the translation memory, optionally employ post editing (PE) or other post-processing, import the translated text back into the translation memory for improved future processing, and reassemble and transmit the final translation product including burdened and unburdened content together, with translation of the unburdened content. In various embodiments, burdened content is stored in a first jurisdiction and unburdened content is translated and/or otherwise processed in a second jurisdiction different from the first jurisdiction.

20 Claims, 4 Drawing Sheets

(56)     References Cited

U.S. PATENT DOCUMENTS

| | | | |
|---|---|---|---|
| 2004/0260535 A1* | 12/2004 | Chen | G06F 9/543 |
| | | | 704/9 |
| 2013/0185368 A1* | 7/2013 | Nordstrom | H04W 4/21 |
| | | | 709/206 |
| 2014/0172407 A1* | 6/2014 | Eden | G06F 40/42 |
| | | | 704/2 |
| 2019/0036973 A1* | 1/2019 | Roth | H04L 63/0263 |
| 2023/0325613 A1* | 10/2023 | Ghatage | G06F 40/58 |
| 2025/0156898 A1* | 5/2025 | Crabtree | G06Q 30/0277 |

* cited by examiner

Fig. 2

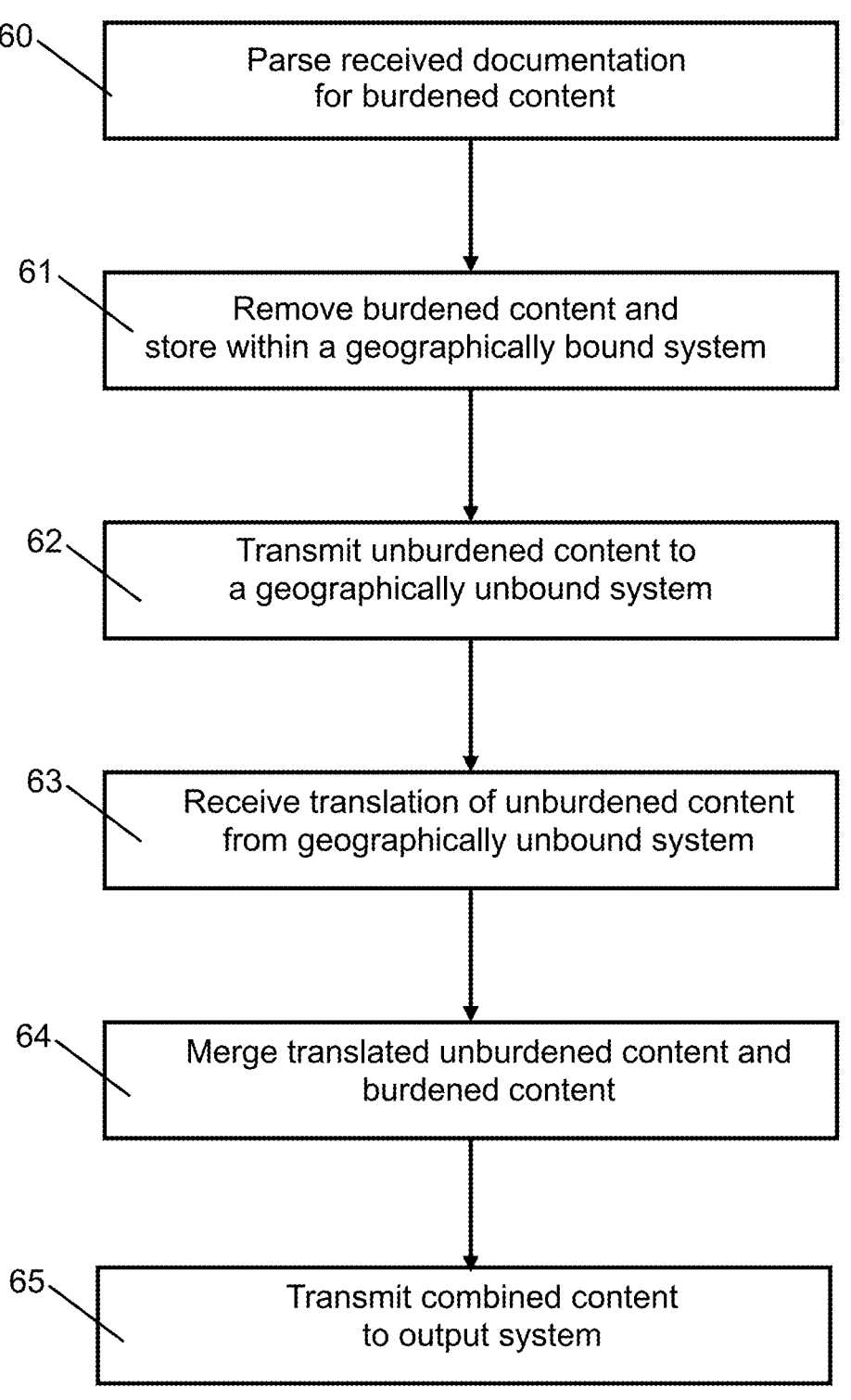

60 — Parse received documentation for burdened content

61 — Remove burdened content and store within a geographically bound system

62 — Transmit unburdened content to a geographically unbound system

63 — Receive translation of unburdened content from geographically unbound system 64 — Merge translated unburdened content and burdened content 65 — Transmit combined content to output system

Fig. 3

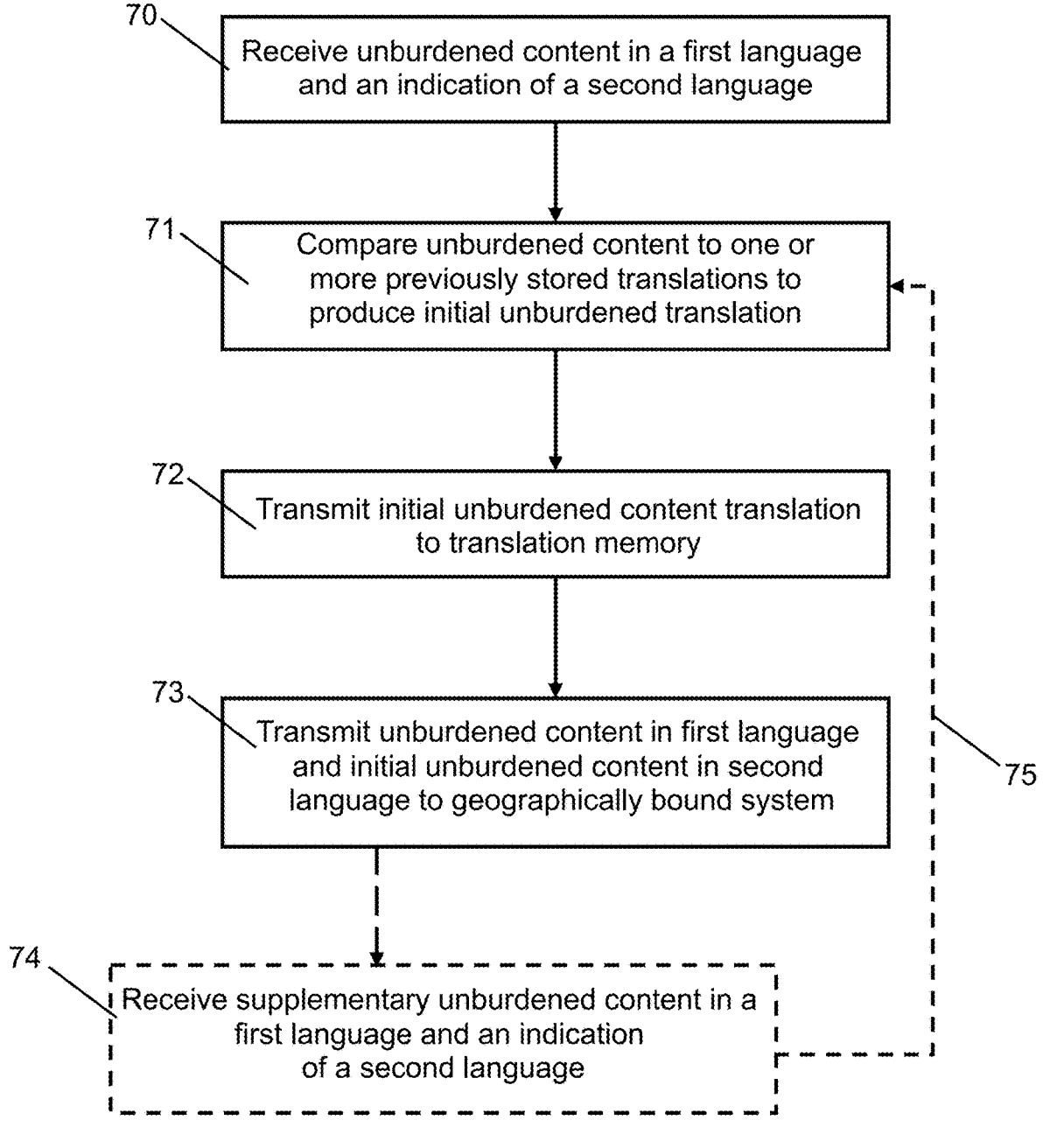

70  Receive unburdened content in a first language and an indication of a second language 71  Compare unburdened content to one or more previously stored translations to produce initial unburdened translation 72  Transmit initial unburdened content translation to translation memory 73  Transmit unburdened content in first language and initial unburdened content in second language to geographically bound system 74  Receive supplementary unburdened content in a first language and an indication of a second language

75

REAL TIME TRANSLATION SYSTEM AND METHOD INVOLVING BURDENED AND UNBURDENED CONTENT

CROSS-REFERENCE TO RELATED APPLICATIONS

The present application is a continuation of U.S. patent application Ser. No. 19/286,965, filed on Jul. 31, 2025, which is a continuation-in-part application of U.S. patent application Ser. No. 19/068,128 filed on Mar. 3, 2025, the disclosures of which are incorporated by reference herein in their entireties.

TECHNICAL FIELD

The present disclosure relates to translation systems, and more particularly to a real-time translation system and method facilitating transmission of various content types.

BACKGROUND AND SUMMARY

Presently, patients are generally discharged from hospital care with English only care instructions and summaries. This causes a problem for hospitals because non-English speaking patients cannot read these instructions and therefore will likely have difficulties understanding actions to take, with a commensurate increased risk of readmission compared to the English-speaking population.

Complicating this problem, health care and personally identifiable information ("protected health information" or "PHI") is highly regulated and/or protected in many jurisdictions. In some cases, transmission of PHI is prohibited or at least highly restricted outside of a jurisdiction. In other cases, storage of PHI is prohibited or at least highly restricted.

A related challenge is obtaining accurate and quick translations. In some cases, external and/or extraterritorial computing systems can most rapidly and accurately translate content. However, overall speed is affected by the available network connections between electronic systems and any required encryption/decryption of the content. Also, limiting packet size and frequency of transmission of content to be translated is desirable to facilitate speedy processing. Further, it is not always desirable or permissible to provide external and/or extraterritorial computing systems with the ability to decrypt encrypted communications. As such, a technical solution is needed to facilitate accuracy and speed of unburdened content translation while maintaining security of protected content.

Embodiments as disclosed herein translate content such as discharge instructions received in a first language such as English, scan, parse, remove and store burdened content such as PHI from the discharge instructions, apply a translation memory to the unburdened content, optionally employ artificial intelligence (AI) translation of text not addressed by the translation memory, optionally employ post editing (PE) or other post-processing, import the translated text back into the translation memory for improved future processing, and reassemble and transmit the final translation product including burdened and unburdened content together, with necessary translation into a second language. In various embodiments, burdened content is stored in a first jurisdiction and unburdened content is translated and/or otherwise processed in a second jurisdiction.

In various embodiments, the received content is encrypted to prevent the content from being unnecessarily exposed. In such cases, embodiments described herein can decrypt all or a portion of the encrypted content, optionally retain burdened content in encrypted form and segment out unburdened content to be unencrypted for translation. In various embodiments, translated unburdened content is re-encrypted along with matching burdened content to facilitate protection of the burdened content throughout the translation process.

In various embodiments, multiple messages containing the final translation product are transmitting to different users of different computers in parallel. In various embodiments, the multiple messages may differ in language translation or other aspect based on the recipient. In various embodiments, an artificial intelligence component improves functioning of embodiments of the system and method as disclosed herein in one or more stages. In various additional embodiments, memory usage for alternative translation options is tracked for memory/storage optimization. According to additional embodiments, network traffic volume during translation processing is tracked and the timing of messages, memory updates and component training is dynamically adjusted to improve network functioning.

BRIEF DESCRIPTION OF THE DRAWINGS

FIGS. 2 and 3 are flow diagrams illustrating exemplary process flows according to embodiments of the present disclosure.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a processor may encompass one or more processors, reference to a network may encompass one or more networks and so forth.

Figure 1:
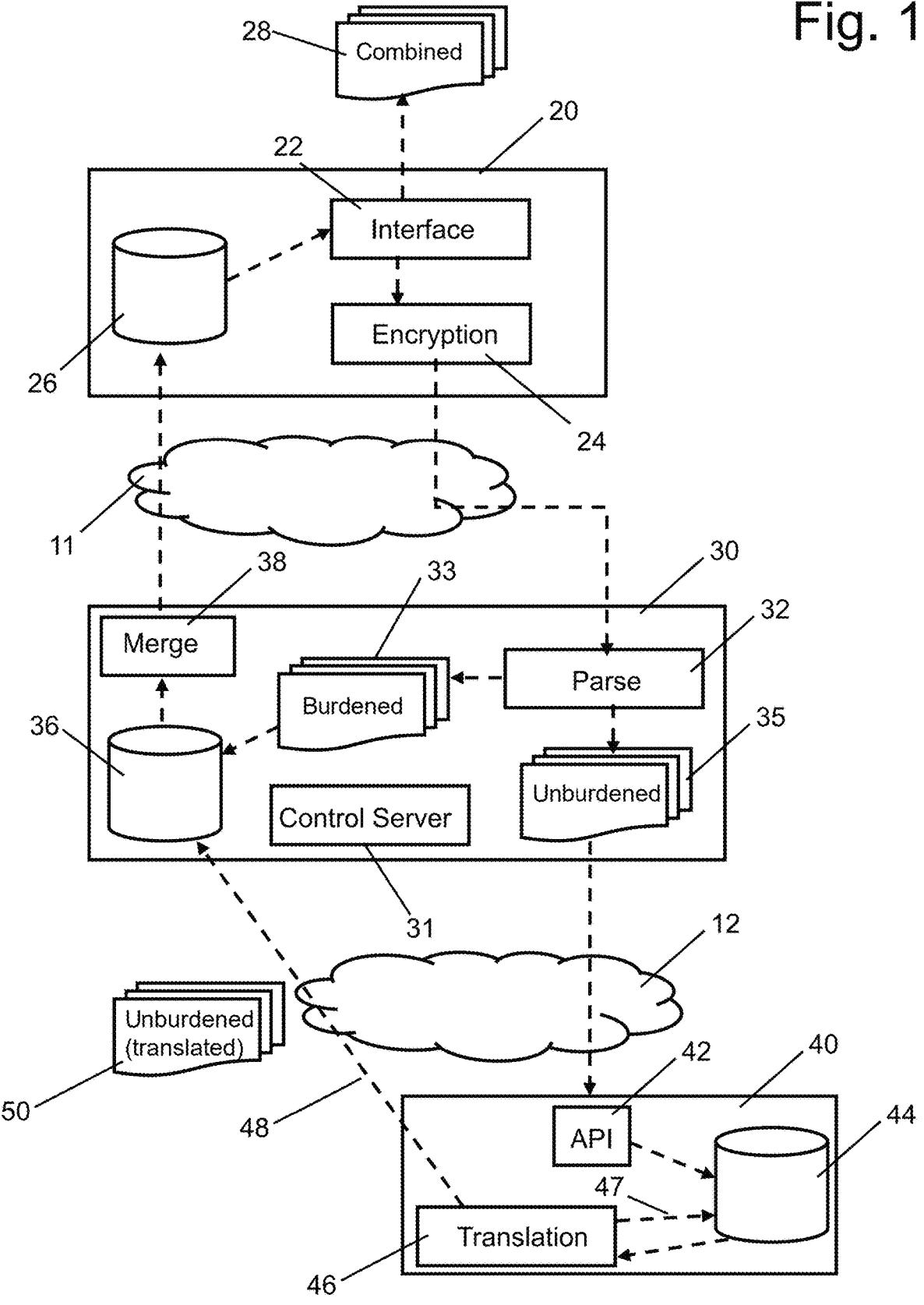
FIG. 1 is a schematic diagram of one or more systems illustrating processing of burdened and unburdened content according to embodiments of the present disclosure.

As shown in FIG. 1, an output system 20 is in communication with a geographically bound system 30 via network 11, and the geographically bound system 30 is in communication with a geographically unbound system 40 via network 12. It will be appreciated that network 11 and network 12 can be the same network such as the Internet, for example, according to various embodiments of the present disclosure. The output system 20 can be a hospital system and/or healthcare services system, for example, from which discharge instructions are issued when a patient is discharged after treatment. The original discharge instructions may be produced in a first language such as English via an interface 22 of the output system 20.

It will be appreciated that the output system 20 can be embodied as more than one computing device in networked communication so as to permit multiple patient checkout stations within one or more facilities within the hospital system and/or healthcare services system. For example, a single hospital may have one or more patient checkout stations in one or more of the following areas: an emergency room (ER) area, a surgery area, an outpatient care area, and other specific care areas depending upon the services offered at that hospital. As a further example, a healthcare services system may include multiple physical facilities, each of which may have one or more patient checkout stations in areas as described above. Each checkout station is an embodiment of an interface 22 according to the present disclosure. It will be appreciated that different forms of interfaces may be employed in accordance with the present disclosure. For example, there may be an interface for an administrative professional, or an interface for a trusted person associated with a patient. Such other interfaces may not be at a facility checkout station.

According to various embodiments, regardless of location or functioning as a checkout station, the interface 22 can be a computing device with a processor, a memory and a visual display. Optionally, the interface 22 includes or is in communication with a printing device for printing hard copies of content such as discharge instructions. In various embodiments, the processor is capable of executing instructions stored in the memory to facilitate translations for display and/or printing using a display and/or printer in networked communication with the processor. The memory can be local or centralized as will be understood to those of skill in the art. In various embodiments, the interface 22 facilitates issuance of electronic communications to system 30, which may optionally be encrypted via encryption component 24 provided as part of the output system 20.

In various embodiments, electronic content in the form of discharge instructions or other content is sent from the interface 22 to system 30. The interface 22 can include software operating thereon such as in the form of electronic health records (EHR) software and a user may input a selection via interface 22 to initiate the translation of the desired content from a first language into a second language. The interface 22 may receive and/or have access to discharge instructions that may have been prepared via the interface 22 or another computing device within system 20. Optionally, the interface 22 displays the content in the first language to be translated. In embodiments of the selection operation, the selection is made by clicking or otherwise selecting functionality such as via an icon for translation appearing in the user interface 22 via the EHR software. The selection can include a selection of the content to be translated, a selection and/or identification of the first language the content currently exists in, and a selection and/or identification of a second language to which the content or at least a portion thereof is to be translated. Such first and second language selections can be based on the user's own knowledge or prior knowledge regarding language preferences of a patient, for example. Such prior knowledge may already be stored in a database (e.g., 26) accessible by and/or in communication with the interface 22. The electronic message from interface 22 of system 20 can include patient demographic information and a file containing address verification service (AVS) information, for example. In various embodiments, a file type such as rich text file (RTF) can be employed. In various embodiments, the interface 22 can display options for obtaining supplemental units, such as a translation accuracy evaluation, or a translation to a third language, for example. The supplemental units can be a form of data, a preference or some other user selection that influences the end product to be sent and/or received once translation has occurred in accordance with the present disclosure. An accuracy evaluation may be desirable by administrative personnel wishing to understand the accuracy of translations being produced for patients at a facility or within a healthcare system, for example. A third language translation may be desirable by additional individuals, such as a trusted outside party associated with a patient who may not be fluent in the original language (e.g., original English discharge instructions) or second language (e.g., French language for a French-speaking patient) and who requires or prefers a third language, for example.

Once the content, language(s) and any supplemental units are selected and transmitted, the geographically bound system 30 receives the input. In various embodiments, the geographically bound system 30 operates as or with a cloud computing service such as Amazon Web Services™. In various embodiments, a component 32 digitizes, converts and extracts or otherwise parses the content received from system 20, so as to identify, code and separate burdened content. Burdened content can take many forms according to the present disclosure, and can be restricted financial information, personal information, such as PHI, a medical record, property information, government intelligence information or other information that must be properly managed and which requires one or more added layers of security or other governance for proper handling. In the instance of healthcare information, there may be PHI that constitutes burdened content within a set of discharge instructions. Such burdened content may be legally or otherwise restricted to a territory such that it cannot be disclosed physically or electronically outside of the territory and/or a given jurisdiction. Component 32 parses the burdened content 33 and stores it in a geographically bound system database 36 for later use as described herein. Component 32 may then pass unburdened content 35 to the geographically unbound system 40, as shown in FIG. 1. Unburdened content 35 can be content that is not subject to restrictions, whether for security, legal, jurisdictional or other reasons. Unburdened content 35 can thus include an indication of a second language to which the unburdened content is to be translated.

In various embodiments, the geographically unbound system 40 receives the unburdened content 35 via an application programming interface (API) 42, as shown in FIG. 1. The unburdened content can be compared by system 40 to one or more previously stored translations of content as may be stored in unbound system database and/or translation memory 44, for example. A translation component 46 can employ the one or more previously stored translations to generate a translation of the unburdened content. Such translation can be transmitted to the translation memory 44 as indicated at 47 in FIG. 1 and can further be transmitted back to geographically bound system 30 as at 48. It will be appreciated that transmitting the unburdened content 50 to system 30 can include transmitting the original unburdened content in the first language along with the unburdened content as translated into the second language. In various embodiments, translation component 46 can operate to post-process and/or permit post-processing of at least a portion of the translated unburdened content for accuracy and completeness, for example. Such post-processing can be performed manually such as by providing a user interface as part of system 40 and/or translation component 46 to permit a user to post-process at least a portion of the translation, for example.

The translated unburdened content 50 can then, upon receipt by the geographically bound system 30, be combined with the burdened content (e.g., untranslated burdened content) stored in database 36 using a merge component 38. Such re-combined or merged content can then be sent by system 30 to output system 20 and stored in output system database 26. In various embodiments, an electronic file type such as portable document format (PDF) can be employed. The combined content can include, for example, patient demographic information (e.g., PHI) and the translated unburdened content, which can be in the original language to be translated and in the second language into which it was translated as described elsewhere herein. Interface 22, upon being made aware of the availability of the combined content can then issue the combined content in the form of printed or electronic content 28 as shown in FIG. 1. In various embodiments, the content 28 is bilingual, including the content in the original or source language and the translated content in the second or target language. In various embodiments, content 28 can be delivered to the patient in near real-time (e.g., within seconds or minutes) once the translation is initiated via interface 22 of output system 20. In various embodiments, the combined content 28 from the output system 20 can be provided as an update on a display such as the interface 22. Such update can show the original content in the first/original language along with the translated content, which may be the translated unbur-dened content as described elsewhere herein. In various embodiments, the interface 22 displays the received docu-mentation for a first time interval, and displays the combined translation as an update to the interface at a second time interval after the first time interval.

According to various embodiments, system 30 can include a control server 31 operable to provide instructions to various components such as components 32 and 38. For example, control server 31 can instruct component 32 to parse received documentation in a first language for bur-dened content and (optionally) unburdened content, remove and store the burdened content in the first language, transmit unburdened content from the received documentation in the first language to a geographically unbound system, receive a second language translation of the unburdened content in the first language from the geographically unbound system, combine the burdened content and the second language translation of the unburdened content into a combined translation and transmit the combined translation to output system 20. In various embodiments, the control server 31 is or is part of geographically bound system 30, which can be situated in a first jurisdiction, as described elsewhere herein. The geographically unbound system 40 can be located in a second jurisdiction different from the first jurisdiction as described elsewhere herein.

In various embodiments, the output system 20 includes electronic health records (EHR). While the burdened content can be translated prior to combining the burdened content and the second language translation of the unburdened content, it will be appreciated that a translation of the burdened content may not be required in various applica-tions of the presently disclosed embodiments. The combined output produced by merge component 38 can be or include the burdened content along with the second language trans-lation of the unburdened content. In various embodiments, the combined output produced by merge component 38 can be or include the burdened content in a first language, the unburdened content in the first language and the second language translation of the unburdened content. Prior to executing stored instructions, the control server 31 can be operable to receive a request for the combined translation from the output system 22. Further, the control server 31 can, upon receiving the second language translation of the unburdened content 50, determine whether the second lan-guage translation of the unburdened content meets or exceeds a predetermined accuracy threshold prior to com-bining the burdened content and the second language trans-lation of the unburdened content. For example, if a prede-termined accuracy threshold of 95% is established and the second language translation of the unburdened content is determined to be below that threshold, the second language translation may be rejected and messaging delivered to geographically unbound system 40 to re-translate the unbur-dened content. In various embodiments, the accuracy deter-mination is performed by control server 31. However, in other embodiments, the accuracy determination is per-formed by a suitable component within geographically unbound system 40 before the translated unburdened content 50 is sent to geographically bound system 30.

It will be appreciated that, according to various embodi-ments, the process of beginning the translation process to receiving and issuing the electronic content 28 can occur in near-real time so that the translated instructions are received back by the output system 22 in a timely fashion for delivery to the non-English speaking patient, in the discharge instruc-tion example. The parsing and removal of burdened content necessarily reduces the amount of translation required, and the employment of the translation memory 44 with one or more previously stored translations permits much faster processing of the original content so as to facilitate the near real-time processing as described herein. In such ways, the embodiments as described herein are specifically configured to provide a technical solution to a particular problem utilizing an unconventional combination of steps/operations to carry out aspects of the present disclosure. In particular, embodiments herein implement a unique combination of steps to provide a novel approach to parsing, removing and storing burdened content, applying a translation memory to unburdened content, importing the translated unburdened content back into the translation memory for improved future processing, and reassembling and transmitting the final translation product including burdened and unburdened content together, with requested translation.

In various embodiments, geographically bound system 30 parses, manipulates and stores the burdened content in a first geographic region or jurisdiction (e.g., the United States) and translation of the unburdened content takes place via geographically unbound system 40 in a second geographic region or jurisdiction (e.g., outside of the United States) that is different from the first region or jurisdiction.

In various embodiments, the burdened content is or includes personally identifiable health information. It will be appreciated that the geographically unbound system 40 can be or include an automated translation system (e.g., trans-lation component 46) operable to compare the unburdened content to previously stored translations from the first lan-guage to the second language to produce an initial unbur-dened content translation. In various embodiments, post-processing of the initial unburdened content translation takes place to produce the second language translation of the unburdened content.

FIGS. 2 and 3 are flow diagrams illustrating exemplary processes in accordance with the present disclosure. FIG. 2 illustrates processes as may occur with respect to geographically bound system 30, for example. In FIG. 2, as at 60, received documentation in a first language is parsed for burdened content. The received documentation can be after-visit summary or patient discharge instructions, for example. As at 61, the burdened content in the first language is removed and stored within a geographically bound system, such as system 30 in FIG. 1. As at 62, unburdened content in the first language from the received documentation is transmitted to a geographically unbound system, such as system 40 in FIG. 1. As at 63, a second language translation of the unburdened content in the first language is received from the geographically unbound system. As at 64, the burdened content and the second language translation of the unburdened content are joined into a combined translation. As at 65, the combined translation is transmitted to an output system, such as system 20 in FIG. 1.

FIG. 3 illustrates processes as may occur with respect to geographically unbound system 40, for example. In FIG. 3, as at 70, a geographically unbound system such as system 30 receives unburdened content in a first language and an indication of a second language. The indication of a second language can be a selection from a list of available second languages for translation or can be a text entry of the desired second language, among many other examples. As at 71, the unburdened content is compared to one or more previously stored translations from the first language to the second language and an initial unburdened content translation is produced. It will be appreciated that the previously stored translation(s) is/are stored in a translation memory. As at 72, the initial unburdened content translation in the second language is transmitted to the translation memory, such as shown at 47 in FIG. 1. In this way, the initial unburdened content translation can be used as another translation reference in providing increasingly accurate and suitable translations in accordance with the present disclosure. For example, the initial unburdened content translation can be added to a library of pre-translated terms and glossaries and further can be used to train artificial intelligence systems for improving translation accuracies. As at 73, the unburdened content in the first language and the initial unburdened content translation in the second language are also transmitted to a geographically bound system, such as system 30 in FIG. 1.

As described elsewhere herein, the unburdened content can be or include after-visit summary or patient discharge instructions and such content does not include personally identifiable information. In various embodiments, indicated as optional via dashed lines at 74, a new and/or supplementary unburdened content in the first language and an indication of the second language is received by the geographically unbound system. This can be, for example, when interface 22 is used to send a second content package, such as after-visit summary or patient discharge instructions for a second patient different from the first patient. As indicated in dashed line 75, the supplementary unburdened content is compared to previously stored translations from the first language to the second language as at 71, and it will be appreciated that the previously stored translations now include the initial unburdened content translation, which was stored in translation memory as described at 72 above and in FIG. 3. It will further be appreciated that the geographically bound system is in a first jurisdiction and the geographically unbound system is in a second jurisdiction different from the first jurisdiction, according to various embodiments of the present disclosure.

Figure 4:
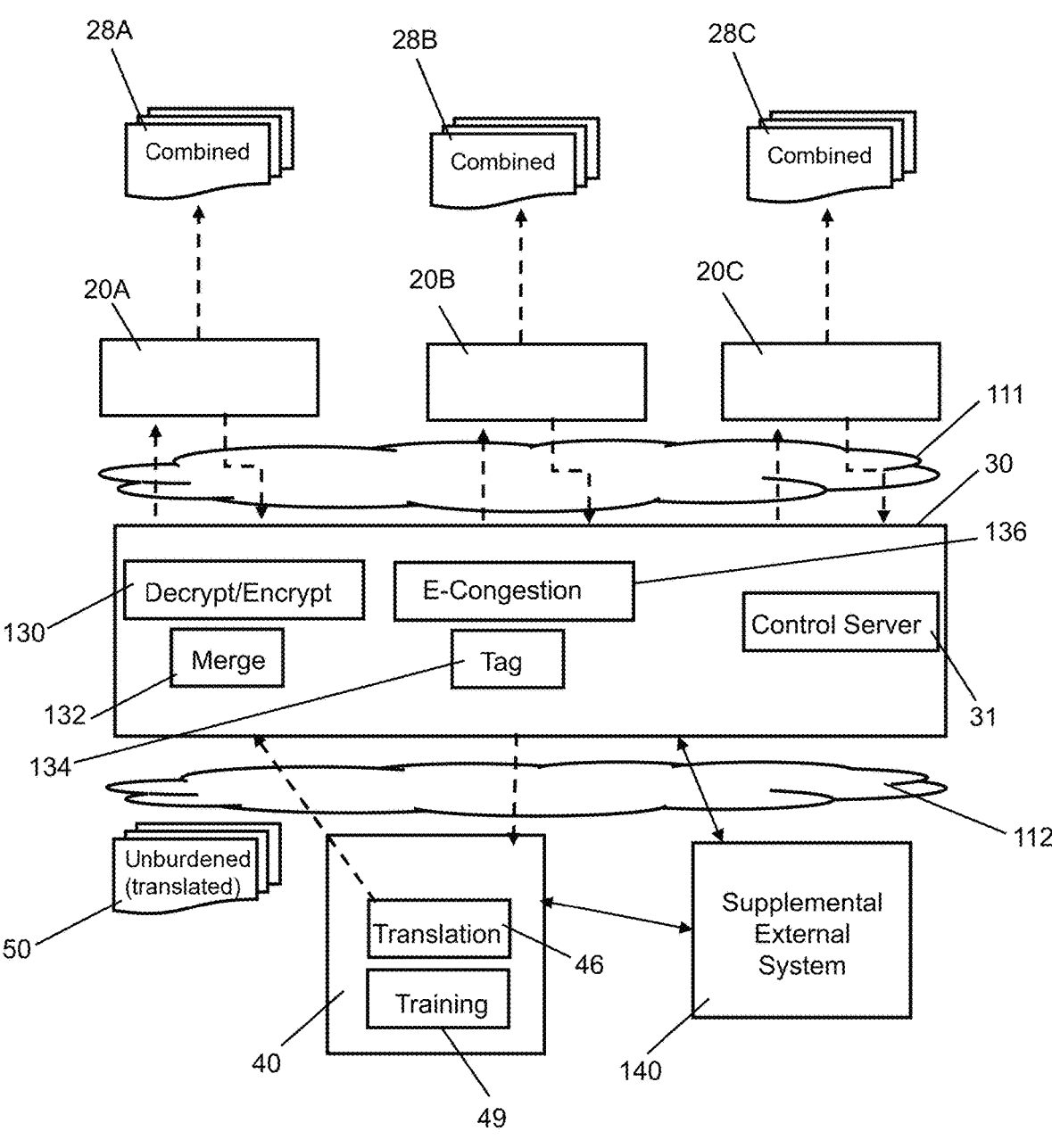
FIG. 4 is a schematic diagram of a system illustrating processing of burdened and unburdened content according to embodiments of the present disclosure.

FIG. 4 illustrates another embodiment of a system according to the present disclosure. As shown therein, multiple output systems 20A, 20B and 20C are provided in communication with geographically bound system 30, which is in communication with geographically unbound system 40, wherein the communications are provided via one or more networks 111, 112 as with FIG. 1. The output systems 20A, 20B and 20C can operate similarly to output system 20 in FIG. 1, with respective interfaces and encryption components as illustrated at 22 and 24 in FIG. 1.

According to embodiments, geographically bound system 30 receives documentation from one or more of the output systems 20A, 20B and 20C. For example, output system 20A may send documentation to geographically bound system 30 after it has been encrypted via an encryption component. Geographically bound system 30 can employ a decryption/encryption component 130 to decrypt some or all of the encrypted documentation from output system 20A. For example, the communication from output system 20A may not specify which elements, sequences or byte streams in the documentation and/or data file pertain to unburdened content and which pertain to burdened content. In such cases, system 30 can operate to decrypt the full file. In other examples, the communication from output system 20A may specify which elements, sequences or streams in the documentation and/or data file pertain to unburdened content and which pertain to burdened content. In such cases, the geographically bound system 30 can decrypt only the portion of the file pertaining to unburdened content, retaining the remaining portion of the file with burdened content as encrypted. In this way, burdened content is not decrypted and remains encrypted until necessary, reducing its risk of exposure. The geographically bound system 30 can then send the unburdened content to be translated to the geographically unbound system 40. In this way, embodiments of the system of the present disclosure efficiently process the unburdened content without requiring excess processing power associated with initially decrypting the entire file, which may require re-encryption once the translated unburdened content is received from the geographically unbound system 40. Once the translated unburdened content in the second language is received from the geographically unbound system 40, the merge component 132 of geographically bound system 30 re-assembles the content for delivery to the output system 20A as combined content 28A. This may optionally include re-encrypting the combined content using decryption/encryption component 130 prior to transmission to the output system 20A. This may also include decrypting the burdened content, assembling the decrypted burdened content with the second language translation of unburdened content, and re-encrypting the combined content for transmission to the output system 20A. In various ways as described herein, embodiments of the system provide a technical solution to maintaining information in secure and protected form while decrypting necessary unburdened content to be translated and obtaining rapid, accurate translation of the unburdened content, all while requiring fewer processing resources as possible to increase speed and reduce computing burden.

As another example with reference to FIG. 4, output systems 20A, 20B and 20C represent different patient checkout stations. These stations can be within the same physical facility, within the same healthcare system at different facilities, or within different healthcare systems at different facilities, for example. The geographically bound system 30 receives respective documentation from each of the output systems 20A, 20B and 20C, and the received documentation is or includes respective healthcare-related discharge instructions for a respective identifiable individual at each station and/or output system 20A, 20B and 20C. The received documentation or an included communication such as a supplemental unit indicates the language to which the documentation is to be translated for each individual documentation. It will be appreciated that the second language can be a different language for any and all of the output systems. As an example with three patient checkout stations, the selected second language for the translation at the first station may be Spanish, at the second station may be German and at the third station may be Japanese. The geographically bound system 30 parses the received documentation for burdened content, removes the burdened content in the first language and, for each identifiable individual, stores the burdened content in the geographically bound system 30. In various embodiments, the burdened content is encrypted, either as it is received by the geographically bound system 30 or by the geographically bound system 30. The geographically bound system 30 then transmits unburdened content (which can be unencrypted) in the first language from the received documentation to a geographically unbound system 40. The geographically unbound system 40 can be or include an automated translation system operable to automatically compare the unburdened content to a set of stored translations from the first language to one or more second languages to produce an initial unburdened content translation, as illustrated in FIG. 1, for example. The geographically bound system 30 then receives a second language translation of the unburdened content in the respectively required language from the geographically unbound system 40 and, for each identifiable individual, decrypts the encrypted burdened content and combines the decrypted burdened content and the second language translation of the unburdened content into a combined translation. The combined translations 28A, 28B and 28C are automatically transmitted to the respective output system 20A, 20B and 20C. In various embodiments, the respective transmissions are performed in parallel, i.e., at the same time and/or during the same time period. In this way, embodiments of the system provide a technical solution to producing required translations in parallel while protecting personal information.

As another example with reference to FIG. 4, output system 20A represents a patient checkout station, output system 20B represents an administrative computing device and output system 20C represents a computing device of a trusted individual associated with an identifiable individual patient from the patient checkout station 20A. The trusted individual may be a friend or relative who may be assisting the identifiable individual patient. Output system 20A may send documentation to geographically bound system 30 and a tag component 134 of geographically bound system 30 can detect that the combined translation, once processed as in FIG. 1 or 4, for example, is to be sent to output system 20A as combined translation 28A, and is to be sent to output system 20B as the combined translation along with an accuracy rating or some other additional communication, which is represented as 28B in FIG. 4. The tag component 134 may further detect that the combined translation, once processed as in FIG. 1 or 4, for example, is to include a translation to a third language before being sent to output system 20C as combined translation 28C. The tag component 134 may, for example, receive an electronic indication from output system 20A in the form of a supplemental unit such as a selected icon or other electronic signal from (e.g., a display, a keyboard, and/or a mouse of) output system 20A requesting that the outputs 28A, 28B and 28C be delivered.

The geographically bound system 30 parses the received documentation for burdened content, removes the burdened content in the first language and stores the burdened content in the geographically bound system 30. In various embodiments, the burdened content is encrypted, either as it is received by the geographically bound system 30 or by the geographically bound system 30. The geographically bound system 30 then transmits unburdened content, which is preferably unencrypted, in the first language from the received documentation to a geographically unbound system 40. The geographically unbound system 40 can be or include an automated translation system operable to automatically compare the unburdened content to a set of stored translations from the first language to a second language to produce an initial unburdened content translation, as illustrated in FIG. 1, for example. The geographically bound system 30 then receives a second language translation of the unburdened content in the respectively required language from the geographically unbound system 40 and combines the burdened content, which may be decrypted, and the second language translation of the unburdened content into a combined translation for output 28A. It will be appreciated that the combined translation may be encrypted before being sent to output station 20A.

As described elsewhere herein, the control server 31 or a suitable component within geographically unbound system 40 can, upon receiving the second language translation of the unburdened content, determine an accuracy rating and/or whether the second language translation of the unburdened content meets or exceeds a predetermined accuracy threshold prior to combining the burdened content and the second language translation of the unburdened content. In the event of determining an accuracy rating, such rating can be appended to at least one instance of the combined translation. For example, the combined translation 28A sent to output system 20A may reflect a combination of the translated unburdened content with the burdened content stored in the geographically bound system 30, whereas the combined translation 28B sent to output system 20B may reflect a combination of the translated unburdened content with the burdened content stored in the geographically bound system 30, and additionally the accuracy rating. The combined translations 28A and 28B are automatically transmitted to the respective output system 20A and 20B, and the respective transmissions can be performed in parallel. As a further example, the geographically unbound system 40 can produce a translation to a third language for the benefit of an additional user (e.g., a trusted third party from output system 20C) and combine such translation with the burdened content to produce a supplemental combined translation 28C for sending to output system 20C, which may be done in parallel with transmissions to output systems 20A and 20B. Supplemental combined translation 28C may or may not include the translation to the second language included with combined translation 28A. In these ways, embodiments of the present disclosure provide a technical solution of sending multiple messages containing the final translation product or variations thereof to different users of different computers or output systems in parallel. In various embodiments, the multiple messages may differ in language translation or other aspect based on the recipient. As in the example herein, the combined translation 28B may appear to an administrative user for quality assurance purposes in real-time along-side the combined translation 28A being sent to an output system 20A such as a patient checkout station and/or the combined translation 28C being sent to an output system 20C such as a third-party computing device.

As another example with reference to FIG. 4, geographically bound system 30 includes an e-congestion component 136 operable to assess network congestion and electronic memory conditions. E-congestion component 136 can assess network congestion to determine optimal or preferred timing of messages, among other things. For example, e-congestion component 136 can track and/or measure the volume and timing of messages sent between geographically bound system 30 and geographically unbound system 40 and/or output system(s) and can dynamically adjust communication timing of messages via control server 31 to improve network and system functioning. E-congestion component 136 can further assess memory usage, optionally storing frequently used and accuracy threshold-meeting translations in a memory within geographically bound system 30 such that transmissions to and from geographically unbound system 40 can be reduced. In these ways, embodiments of the present disclosure provide a technical solution through timing of messages such that prioritized messages (e.g., patient communications) may occur most quickly whereas other communications can be delayed or even avoided, such as when geographically bound system 30 accesses its related storage so as not to require communication with geographically unbound system 40. In measuring the volume and timing of transmissions sent to and received from the geographically bound system, the e-congestion component 136 can measure network throughput (e.g., in kilobits per second (kbps)) and compare the size of transmitted messages in kilobits with the timing of delivery once sent. Such metrics can be compared with an established congestion threshold, and upon the volume or timing of transmissions exceeding the congestion threshold, the transmission of the combined translations may be delayed or staggered over time. For example, the control server may prioritize combined translations being sent to a patient discharge station as opposed to an administrative output system or a third-party output system.

According to various embodiments, the geographically bound system 30 can parse received documentation in a first language for burdened content, wherein the received documentation is or includes respective healthcare-related discharge instructions for each of two or more identifiable individuals from respectively associated output systems. The geographically bound system 30 can further remove the burdened content in the first language for each of the respective healthcare-related discharge instructions and, for each identifiable individual, encrypt and store the burdened content from each of the respective healthcare-related discharge instructions. The geographically bound system 30 can further transmit unburdened content in the first language for each of the respective healthcare-related discharge instructions to the geographically unbound system 40, wherein the geographically unbound system 40 employs the automated translation component 46 to automatically compare the unburdened content to a set of stored translations from the first language to a second language to produce an initial unburdened content translation. The geographically bound system 30 then receives, for each of the respective healthcare-related discharge instructions, a second language translation of the unburdened content in the first language from the geographically unbound system 40. For each identifiable individual, the geographically bound system 30 decrypts the encrypted burdened content and combines the decrypted burdened content and the second language translation of the unburdened content for each of the respective healthcare-related discharge instructions into combined translations and transmits, in parallel, the respective combined translations to a respective associated output system.

In various embodiments, the second language is different for the unburdened content as between at least two of the identifiable individuals, such as when one individual prefers Spanish and another individual prefers German, for example. Further, in various embodiments, a second language translation can be transmitted to a training component (e.g., 49 in FIG. 4), such as when the second language translation produces an accuracy metric that exceeds a predetermined accuracy threshold. It will be appreciated that the training component 49 can be associated with the geographically unbound system 40 or with the geographically bound system 30. According to various embodiments, the unburdened content in the first language is transmitted to a supplemental external system 140 upon the second language translation producing an accuracy metric that falls below a predetermined accuracy threshold. This transmission can occur from either geographically bound system 30 or geographically unbound system 40, as illustrated in FIG. 4. When employing the supplemental external system, the geographically bound system 30 and/or geographically unbound system 40 can receive a supplemental second language translation of the unburdened content in the first language from the supplemental external system and can evaluate such supplemental translation to produce a supplemental accuracy metric that meets or exceeds the predetermined accuracy threshold.

As described, the present disclosure contemplates a variety of different systems, components and methods each having one or more of a plurality of different features, attributes, or characteristics. A "system" as used herein can refer, for example, to various configurations of one or more computing networks, processing elements or computing devices, such as desktop computers, laptop computers, tablet computers, personal digital assistants, mobile phones, and other mobile computing devices. In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information. The processor of the computing device is configured to execute the events, messages, or commands represented by such data or signals in conjunction with the operation of the computing device. Embodiments of the disclosure can be developed on specialized hardware, software or a combination of hardware and software. Various components as described herein can also be or include a computing device, and/or a set of instructions in the form of a software program or software code operable by a processor to execute instructions such that the component(s) can execute the events, messages, or commands as described herein.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semi-conductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RE, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or a combined software and hardware implementation, any and all of which may generally be referred to herein as a "circuit," "module," "network," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs, processing elements or components. These programs, processing elements and/or components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices, elements or components of the present disclosure that are in communication with each other do not need to be in continuous communication with each other. Further, devices, elements or components in communication with other devices or components can communicate directly or indirectly through one or more intermediate devices, elements or components or other intermediaries. Further, descriptions of embodiments of the present disclosure herein wherein several devices, elements and/or components are described as being in communication with one another does not imply that all such devices, elements or components are required, or that each of the disclosed devices, elements or components must communicate with every other device, element or component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers, processing elements and/or computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#VB.NET, Python or the like, conventional procedural programming languages, such as the "C" programming language, Visual Basic, Fortran 2003, Perl COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:
1. A system, comprising:
a control server geographically bound within a first jurisdiction, wherein the control server comprises a proces- sor and a memory storing instructions which, when executed by the processor, cause the processor to:

receive encrypted documentation;

decrypt at least a first portion of the received encrypted documentation, wherein the decrypted portion of the received encrypted documentation comprises unburdened content in a first language;

store a second portion of the encrypted documentation;

transmit the unburdened content to a geographically unbound system, wherein the geographically unbound system comprises an automated translation system operable to automatically compare the unburdened content to a set of stored translations from the first language to a second language to produce an initial unburdened content translation;

receive a second language translation of the unburdened content in the first language from the geographically unbound system;

decrypt the second portion of the encrypted documentation, wherein the second portion comprises burdened content;

combine the burdened content and the second language translation of the unburdened content into a combined translation;

encrypt the combined translation; and transmit the encrypted combined translation to an output system.

2. The system of claim 1, wherein the instructions further cause the processor to measure the volume and timing of transmissions sent to and received from the geographically unbound system, and upon the volume or timing of transmissions exceeding a congestion threshold, staggering the transmission of the combined translations over time.

3. The system of claim 1, wherein the instructions further cause the processor to transmit the unburdened content in the first language to a supplemental external system upon the second language translation producing an accuracy metric that falls below a predetermined accuracy threshold.

4. The system of claim 3, wherein the instructions further cause the processor to receive a supplemental second language translation of the unburdened content in the first language from the supplemental external system that produces a supplemental accuracy metric that meets or exceeds the predetermined accuracy threshold.

5. The system of claim 1, wherein the instructions further cause the processor to transmit the second language translation of the unburdened content to a training component for the geographically unbound computing system.

6. The system of claim 5, wherein the instructions cause the processor to transmit the second language translation of the unburdened content to the training component upon the second language translations producing an accuracy metric that exceeds a predetermined accuracy threshold.

7. A system, comprising:

a control server geographically bound within a first jurisdiction, wherein the control server comprises a processor and a memory storing instructions which, when executed by the processor, cause the processor to:

parse received documentation in a first language for burdened content, wherein the received documentation comprises respective healthcare-related documentation for each of a plurality of identifiable individuals from a plurality of output systems;

remove the burdened content in the first language from the respective healthcare-related documentation for each identifiable individual of a plurality of identifiable individuals and, for each identifiable individual of the plurality of identifiable individuals, store the burdened content;

transmit unburdened content in the first language for the respective healthcare-related documentation for each identifiable individual to a geographically unbound system, wherein the geographically unbound system comprises an automated translation system operable to automatically compare the unburdened content to a set of stored translations from the first language to a second language to produce an initial unburdened content translation;

receive, for each identifiable individual of the plurality of identifiable individuals, a second language translation of the unburdened content in the first language from the geographically unbound system;

for each identifiable individual of the plurality of identifiable individuals, combine the burdened content and the second language translation of the unburdened content for each of the respective healthcare-related discharge instructions into combined translations; and transmit, in parallel, each respective one of the combined translations to a respective associated output system of the plurality of output systems.

8. The system of claim 7, wherein the second language is different for the unburdened content as between at least two of the identifiable individuals.

9. The system of claim 7, wherein the instructions further cause the processor to transmit the second language translations to a training component for the control server.

10. The system of claim 9, wherein the instructions cause the processor to transmit the second language translations to the training component upon the second language translations producing an accuracy metric that exceeds a predetermined accuracy threshold.

11. The system of claim 7, wherein the instructions further cause the processor to transmit the unburdened content in the first language to a supplemental external system upon the second language translation producing an accuracy metric that falls below a predetermined accuracy threshold.

12. The system of claim 11, wherein the instructions further cause the processor to receive a supplemental second language translation of the unburdened content in the first language from the supplemental external system that produces a supplemental accuracy metric that meets or exceeds the predetermined accuracy threshold.

13. The system of claim 7, wherein the instructions further cause the processor to measure the volume and timing of transmissions sent to and received from the geographically unbound system, and upon the volume or timing of transmissions exceeding a congestion threshold, staggering the transmission of the combined translations over time.

14. A computer-implemented method, comprising:

parsing received documentation in a first language for burdened content, wherein the received documentation is received from a plurality of output systems and comprises respective healthcare-related documentation for each identifiable individual of a plurality of identifiable individuals;

removing the burdened content in the first language from the respective healthcare-related documentation for each identifiable individual of the plurality of identifiable individuals, and storing the burdened content in a geographically bound computing system;

transmitting unburdened content in the first language from the respective healthcare-related documentation for each identifiable individual of the plurality of identifiable individuals to a geographically unbound system, wherein the geographically unbound system comprises an automated translation system operable to automatically compare the unburdened content to a set of stored translations from the first language to a second language to produce a second language translation of the unburdened content;

receiving, by the geographically bound computing system from the geographically unbound system, the second language translation of the unburdened content for the respective healthcare-related documentation for each identifiable individual of the plurality of identifiable individuals;

combining the burdened content and the second language translation of the unburdened content into combined translations for each identifiable individual; and transmitting, in parallel, each respective one of the combined translations to a respective associated output system of the plurality of output systems.

15. The computer-implemented method of claim 14, wherein the second language is different for the unburdened content as between at least two of the identifiable individuals.

16. The computer-implemented method of claim 14, further comprising transmitting the second language translation of the unburdened content to a training component for the geographically unbound computing system.

17. The computer-implemented method of claim 16, wherein the second language translations are transmitted to the training component upon the second language translations producing an accuracy metric that exceeds a predetermined accuracy threshold.

18. The computer-implemented method of claim 14, further comprising transmitting the unburdened content in the first language to a supplemental external system upon the second language translation producing an accuracy metric that falls below a predetermined accuracy threshold.

19. The computer-implemented method of claim 18, further comprising receiving a supplemental second language translation of the unburdened content in the first language from the supplemental external system that produces a supplemental accuracy metric that meets or exceeds the predetermined accuracy threshold.

20. The computer-implemented method of claim 14, further comprising measuring the volume and timing of transmissions sent to and received from the geographically unbound system, and upon the volume or timing of transmissions exceeding a congestion threshold, staggering the transmission of the combined translations over time.

\*    \*    \*    \*    \*